United States Patent
Vaccaro

(10) Patent No.: US 10,505,352 B2
(45) Date of Patent: Dec. 10, 2019

(54) SEALING COVER BOOT AND COVER AND INTERCONNECTION JUNCTIONS PROTECTED THEREBY

(71) Applicant: CommScope Technologies LLC, Hickory, NC (US)

(72) Inventor: Ronald A. Vaccaro, Taylorsville, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/291,536

(22) Filed: Mar. 4, 2019

(65) Prior Publication Data

US 2019/0199076 A1    Jun. 27, 2019

Related U.S. Application Data

(63) Continuation of application No. 15/969,432, filed on May 2, 2018, now Pat. No. 10,224,700, which is a continuation of application No. 15/493,830, filed on Apr. 21, 2017, now Pat. No. 9,966,744, which is a continuation of application No. 14/245,443, filed on Apr. 4, 2014, now Pat. No. 9,653,895.

(60) Provisional application No. 61/906,134, filed on Nov. 19, 2013.

(51) Int. Cl.
*H02G 3/04*       (2006.01)
*H01R 43/00*      (2006.01)
*H01R 13/52*      (2006.01)
*H01R 24/40*      (2011.01)

(52) U.S. Cl.
CPC ....... *H02G 3/0481* (2013.01); *H01R 13/5219* (2013.01); *H01R 43/005* (2013.01); *H02G 3/0487* (2013.01); *H01R 24/40* (2013.01); *Y10T 29/49194* (2015.01)

(58) Field of Classification Search
CPC ........ H02G 15/18; H02G 1/14; H02G 3/0481; H02G 3/0487; H01R 13/5219; H01R 43/005

See application file for complete search history.

(56) References Cited

U.S. PATENT DOCUMENTS 4,063,793  A   12/1977  Judd
5,857,873  A   1/1999   Castaldo
7,390,221  B2  6/2008   Akino
(Continued)

FOREIGN PATENT DOCUMENTS

CN   102939688   2/2013
GB      955632   4/1964
WO    02/37509   5/2002

OTHER PUBLICATIONS

European Search Report Corresponding to European Application No. 14 863 667; dated Jun. 1, 2017; 13 Pages.

(Continued)

*Primary Examiner* — Hoa C Nguyen
*Assistant Examiner* — Amol H Patel
(74) *Attorney, Agent, or Firm* — Myers Bigel, P.A.

(57) ABSTRACT

A hollow cover boot formed of an elastomeric material includes, in merging succession, a cable collar, a main section, a transition section, and an interconnection section, wherein the main section has a diameter greater than the cable collar and the interconnection section, and the transition section tapers between the main section and the cable collar.

7 Claims, 5 Drawing Sheets

(56) References Cited

U.S. PATENT DOCUMENTS

| | | |
|---|---|---|
| 2008/0245547 A1 | 10/2008 | Low et al. |
| 2011/0207355 A1 | 8/2011 | Amidon |
| 2011/0256755 A1 | 10/2011 | Montena |
| 2011/0263153 A1 | 10/2011 | Lu |
| 2012/0190234 A1* | 7/2012 | Montena ............ H01R 13/5213 439/521 |
| 2013/0115805 A1 | 5/2013 | Montena |

OTHER PUBLICATIONS

Examination Report Corresponding to European Application No. 14863667, dated Nov. 20, 2018.
International Search Report and Written Opinion for corresponding PCT Application No. PCT/US2014/065385, dated Feb. 27, 2015, 11 pages.
Office Action corresponding to Chinese Application No. 201480062221.X; dated Jun. 2, 2017.

* cited by examiner

SEALING COVER BOOT AND COVER AND INTERCONNECTION JUNCTIONS PROTECTED THEREBY

RELATED APPLICATIONS

The present application is a continuation application of and claims priority from U.S. patent application Ser. No. 15/969,432 filed May 2, 2018, now U.S. Pat. No. 10,224,700, which is a continuation application of and claims priority from U.S. patent application Ser. No. 15/493,830 filed Apr. 21, 2017, now U.S. Pat. No. 9,966,744, which is a continuation application of and claims priority from U.S. patent application Ser. No. 14/245,443, filed Apr. 4, 2014, now U.S. Pat. No. 9,653,895, which claims the benefit of U.S. Provisional Patent Application No. 61/906,134, filed Nov. 19, 2013, the disclosures of which are hereby incorporated herein by reference in their entirety.

FIELD OF THE INVENTION

The invention relates generally to a device for environmentally sealing and securing the interconnection between electrical cables.

BACKGROUND

Interconnection junctions, such as the interconnection between two cables or a cable and a piece of electronic equipment, may be subject to degradation from environmental factors such as moisture, vibration and repeated expansion and contraction from daily temperature changes. Outer sealing enclosures that surround or enclose an electrical interconnection have been used to protect such interconnections. Enclosures often apply rigid clamshell configurations that, once closed, may be difficult to open, especially when installed in exposed or remote locations, such as atop radio towers; gaskets or gel seals may be applied at the enclosure ends and/or along a sealing perimeter of the shell.

Elastic interconnection seals are also known. Elastic seals can be advantageous by virtue of being more easily installed over the typically uneven contours of an electrical interconnection. Exemplary configurations are described in U.S. patent application Ser. No. 13/646,952, filed Oct. 8, 2012, and U.S. Ser. No. 13/938,475, filed Jul. 10, 2013, the disclosures of each of which are hereby incorporated by reference herein.

SUMMARY

As a first aspect, embodiments of the invention are directed to an interconnection junction comprising a trunk cable having a first connector at one end and a jumper cable having a second connector at one end. A hollow cover boot formed of an elastomeric material includes, in merging succession, a cable collar, a transition section, a main section, and an interconnection section, wherein the main section has a diameter greater than the cable collar and the interconnection section, and the transition section tapers between the main section and the cable collar. A hollow cover formed of an elastomeric material includes, in merging succession, a cable section, a transition section, a main section, and an interconnection section, wherein the interconnection section has a diameter greater than the main section and the cable section, and the transition section tapers between the main section and the cable section. The first connector and second connector are joined and reside within the main section and the interconnection section of the cover boot, and the interconnection section of the cover at least partially overlies the interconnection section of the cover boot.

As a second aspect, embodiments of the invention are directed to a method of protecting an interconnection junction between a first cable and a second cable, the first and second cables each terminating in, respectively, first and second connectors. The method comprises the steps of: (i) providing the first and second cables, wherein the second cable is inserted into a hollow cover boot and a hollow cover, the cover boot being formed of an elastomeric material and including, in merging succession, a cable collar, a transition section, a main section, and an interconnection section, wherein the main section has a diameter greater than the cable collar and the interconnection section, and the transition section tapers between the main section and the cable collar, the cover being formed of an elastomeric material and including, in merging succession, a cable section, a transition section, a main section, and an interconnection section, wherein the interconnection section has a diameter greater than the main section and the collar section, and the transition section tapers between the main section and the cable section; (ii) joining the first connector to the second connector to form an electrical interconnection; (iii) advancing the cover boot on the second cable to cover the electrical connection, such that the first connector and second connector reside within the main section and the interconnection section of the cover boot and the cable collar engages the first cable; and (iv) advancing the cover on the second cable such that the interconnection section of the cover at least partially overlies the interconnection section of the cover boot, thereby sealing the electrical interconnection.

As a third aspect, embodiments of the invention are directed to a hollow cover boot formed of an elastomeric material, the cover boot comprising, in merging succession, a cable collar, a main section, a transition section, and an interconnection section, wherein the main section has a diameter greater than the cable collar and the interconnection section, and the transition section tapers between the main section and the cable collar.

As a fourth aspect, embodiments of the invention are directed to a hollow cover boot formed of an elastomeric material, the cover boot comprising, in merging succession, a cable collar, a transition section, a main section, and an interconnection section, wherein the main section has a diameter greater than the cable collar, the interconnection section has a diameter great than the main section, the transition section tapers between the main section and the cable collar, and the cable collar is oriented approximately 90 degrees from the interconnection section.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used herein is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
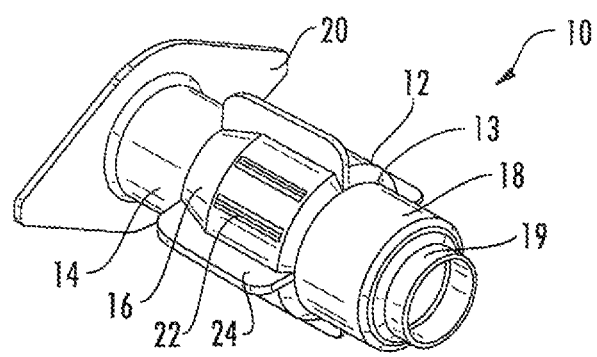
FIG. 1 is a perspective view of a cover boot for an interconnection junction according to embodiments of the invention.
Figure 2:
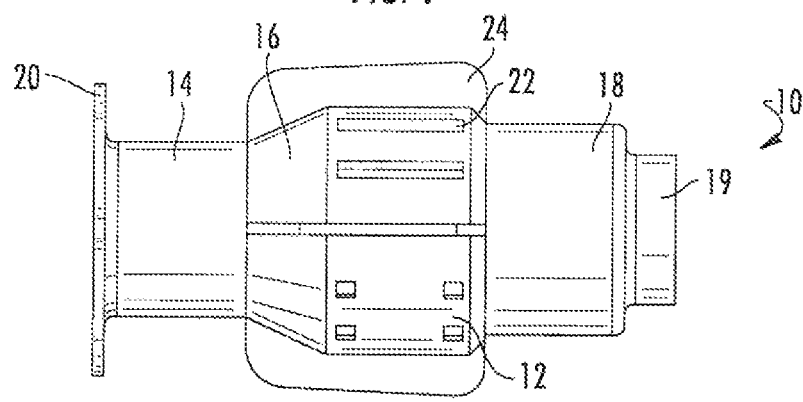
FIG. 2 is a top view of the cover boot of FIG. 1.
Figure 3:
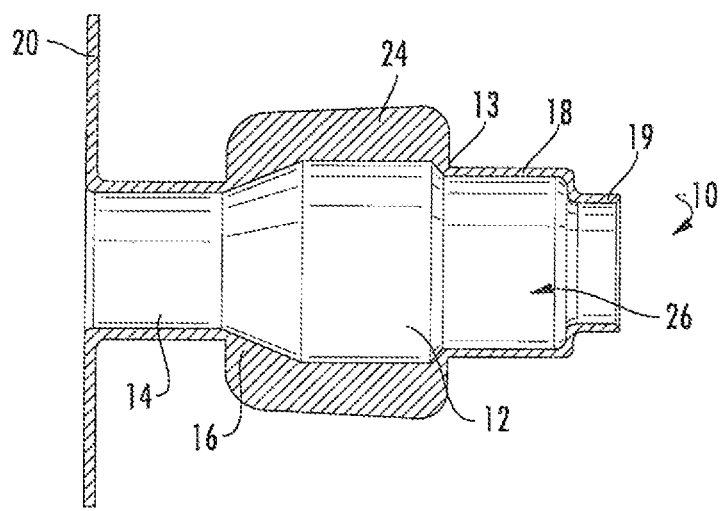
FIG. 3 is a front section view of the cover boot of FIG. 1.

Referring now to the figures, a cover boot for an interconnection junction of coaxial connectors, designated broadly at 10, is illustrated in FIGS. 1-3. The boot 10 includes a generally cylindrical main section 12. A generally cylindrical cable collar 14 is somewhat smaller in diameter than the main section 12. One end of the main section 12 merges with a tapered transition section 16, which in turn merges with the cable collar 14. A diamond-shaped flange 20 extends radially outwardly from the free end of the cable collar 14. The opposite end of the main section 12 includes a wall 13, to which is attached a generally cylindrical interconnection section 18. The interconnection section 18 is smaller in diameter than the main section 12 and may be smaller or larger in diameter than the cable collar 14. A neck 19 (narrower still in diameter) extends from the free end of the interconnection section 18. The resulting structure is hollow and defines a continuous bore 26 that passes through each of the substantially coaxial sections 12, 14, 16, 18, 19.

Four fins 24 are positioned approximately circumferentially equidistant from each other on the outer surface of the main section 12 and transition section 16. The fins 24 extend the length of the main section 12 and transition section 16 and project radially outwardly. Two axially-extending ribs 22 are positioned between each of the fins 24.

The boot 10 may be formed of any number of materials, but is typically formed of an elastomeric material, such as rubber, that can recover to its original shape after significant deformation. The boot 10 is typically formed as a unitary member, and in particular may be formed via injection molding.

Figure 4:
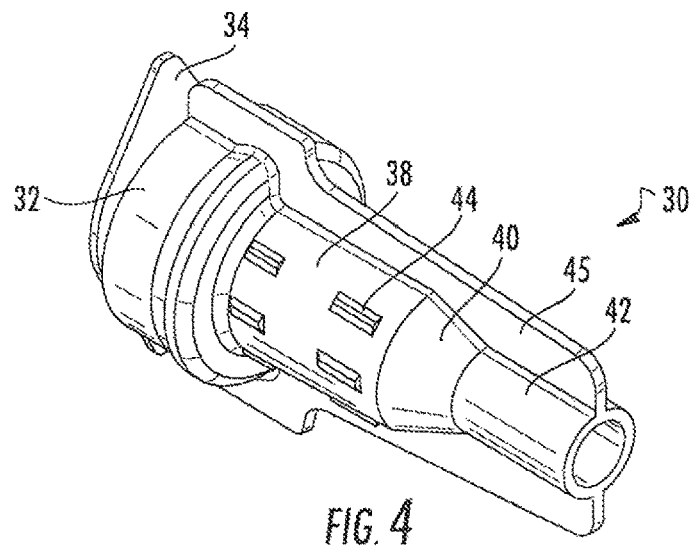
FIG. 4 is a perspective view of a cover to be used in conjunction with the cover boot of FIG. 1 according to embodiments of the invention.
Figure 5:
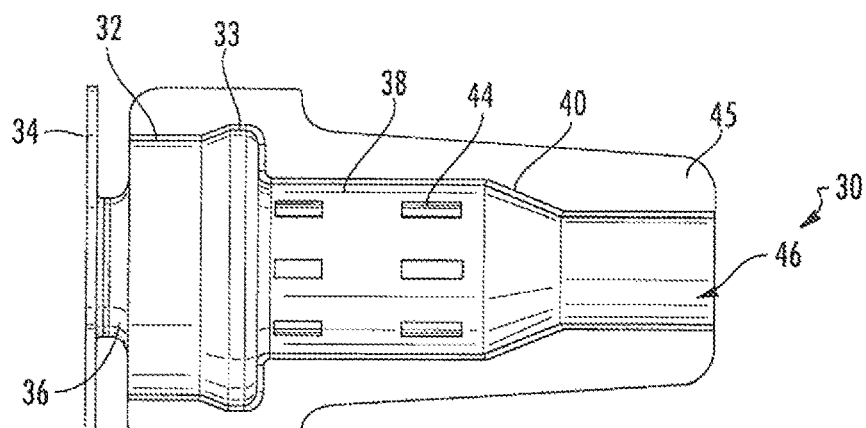
FIG. 5 is a front view of the cover of FIG. 4.
Figure 6:
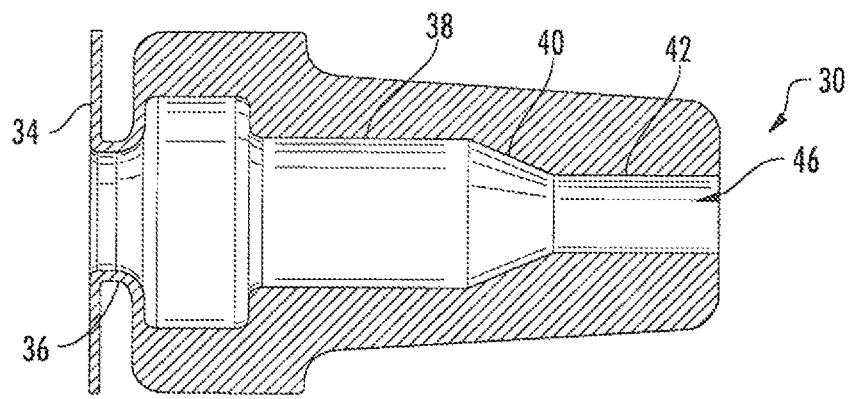
FIG. 6 is a front section view of the cover of FIG. 4.

The boot 10 can be used in conjunction with a second cover (designated broadly at 30 and illustrated in FIGS. 4-6) to protect an interconnection of coaxial or other electrical connectors. As shown in FIGS. 4-6, the cover 30 includes a generally cylindrical interconnection section 32 with a circumferential projection 33. A diamond-shaped flange 34 is mounted to the interconnection section 32 via a short trunk 36. A generally cylindrical main section 38 merges with the interconnection section 32 opposite the trunk 36. The main section 38 is smaller in diameter than the interconnection section 32. A tapered transition section 40 merges with the main section 38; in turn, a generally cylindrical cable section 42 merges with the transition section 40. The cover 30 also includes two opposed axially-extending fins 45 that project radially outwardly and three axial ribs 44 between the fins 45 on each side. Thus, the hollow, generally coaxial sections of the cover 30 define a continuous bore 46.

The cover 30 may be formed of any number of materials, but is typically formed of an elastomeric material, such as rubber, that can recover to its original shape after significant deformation. The cover 30 is typically formed as a unitary member, and in particular may be formed via injection molding.

Figure 7:
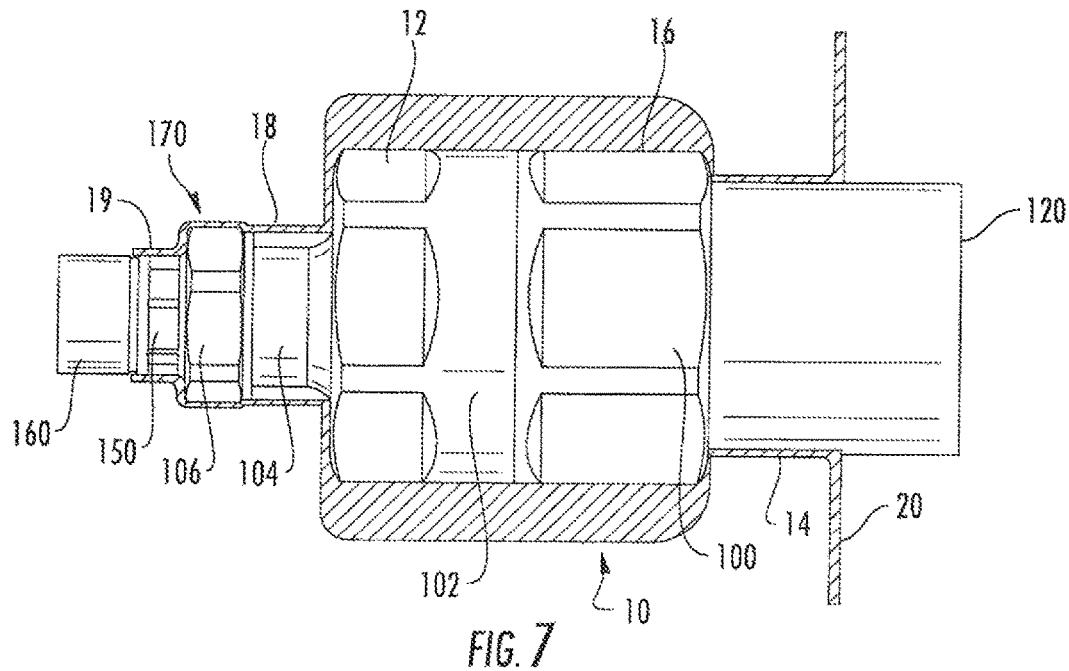
FIG. 7 is a front cutaway view showing the cover boot of FIG. 1 used to protect an interconnection junction of a jumper cable and a trunk cable of a first configuration.
Figure 8:
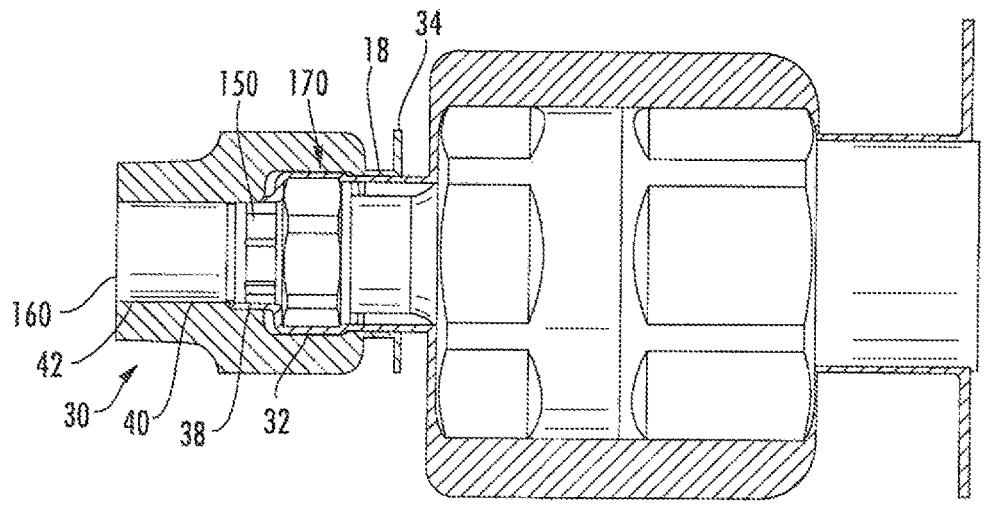
FIG. 8 is a front cutaway view of the interconnection of FIG. 7 with the cover of FIG. 4 added.

As can be seen in FIGS. 7-10, the boot 10 and cover 30 can be employed together to enclose and protect an interconnection of coaxial connectors or other electrical, fiber optic and/or hybrid connectors. FIGS. 7 and 8 illustrate one exemplary configuration for a coaxial connector 100 used on a trunk cable. More specifically, the connector 100 terminates the end of trunk cable 120. The connector 100 includes a body 102 and a stem 104 that extends axially away from the body 102. A nut 106 is rotatably captured on the stem 104. A connector 150 terminates the end of a jumper cable 160. The connector 150 includes a threaded stem (not shown) that extends away from the cable 160. As can be seen in FIGS. 7 and 8, the nut 106 of the connector 100 is threaded onto the stem of the connector 150 to establish an electrical interconnection 170 between the trunk cable 120 and the jumper cable 160. Such connectors are available from CommScope, Inc. (Hickory, N.C.) under the trade name POSITIVE STOP.

As shown in FIG. 7, the boot 10 encloses the interconnection 170. The body 102 of the connector 100 fills the interior of the main section 12 and the transition section 16, which stretches to conform to the shape of the body 102. The cable collar 14 encircles the trunk cable 120. The interconnection section 18 encloses the stem 104 and nut 106 of the connector 100. The neck 19 encloses the remainder of the connector 150.

Referring now to FIG. 8, the cover 30 can then be applied to the boot 10. More specifically, the interconnection section 32 of the cover 30 fits over part of the interconnection 170, with the flange 34 positioned adjacent the main section 12 of the boot 10. The main section 38 and transition section 40 fit over the jumper cable 160. Because the cover 30 overlies the interconnection section 18 and neck 19 of the boot 10, a seal is formed over the interconnection 170 that can help to protect it from moisture and other environmental agents.

In practice, prior to interconnection of the jumper cable 160 with the trunk cable 120, typically both the boot 10 and the cover 30 are inserted via their bores 26, 46 onto the jumper cable 160. Although the boot 10 and cover 30 fit snugly onto the jumper cable 160 due to the sizing of the neck 19 and the cable section 42, the boot 10 and cover 30 can slide along the length of the jumper cable 19 with some tugging by an operator. The boot 10 is positioned nearer the connector 150 than is the cover 30. Once the jumper cable 160 is connected with the trunk cable 120 (via threading of the nut 106 of the connector 100 onto the threaded stem of the connector 150), the boot 10 is slipped over the interconnection into the position shown in FIG. 7. The resilience and elasticity of the material of the boot 10 enable it to deform elastically to be slipped over the connectors 100, 150. Once the boot 10 is in place, the interconnection section 32 of the cover 30 can be slipped over the neck 19 and interconnection section 18 of the boot 10 (see FIG. 8).

Figure 9:
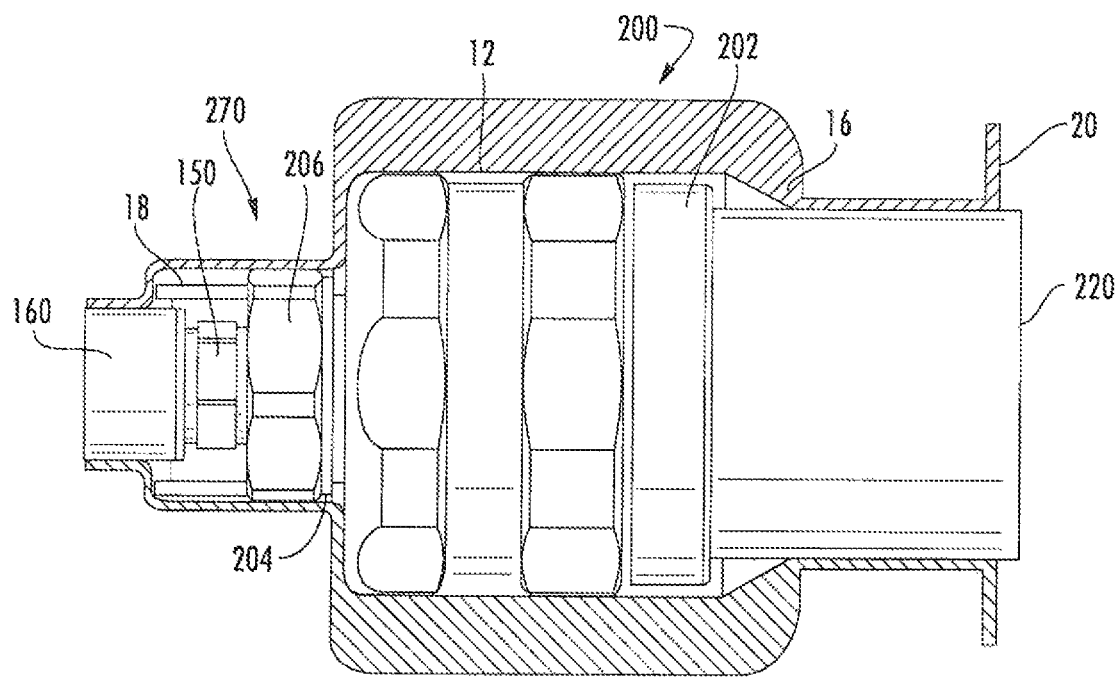
FIG. 9 is a front cutaway view showing the cover boot of FIG. 1 used to protect an interconnection junction of a jumper cable and a trunk cable of a second configuration.
Figure 10:
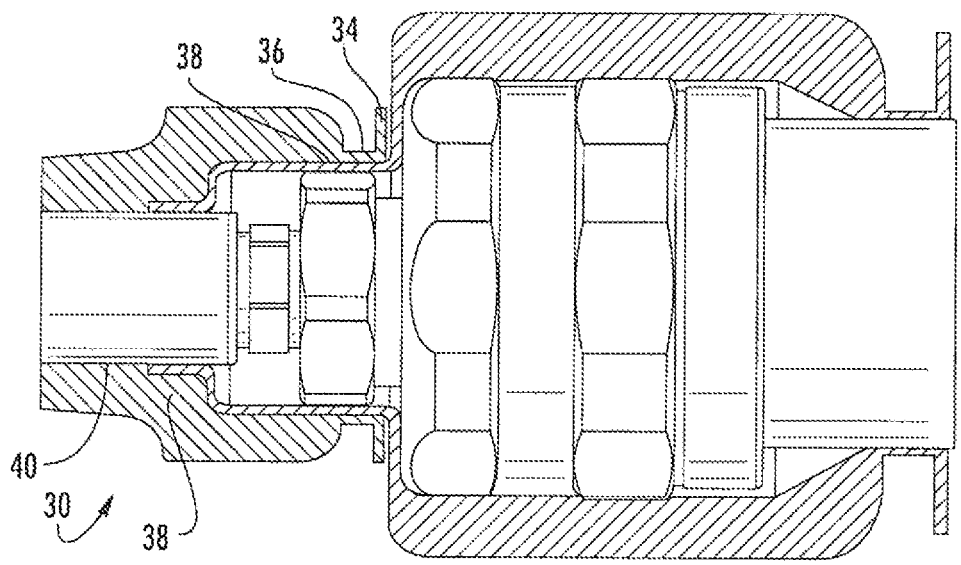
FIG. 10 is a front cutaway view of the interconnection of FIG. 9 with the cover of FIG. 4 added.

As can be seen in FIGS. 9 and 10, the boot 10 and cover 30 can be used with coaxial cable interconnections of other configurations. The interconnection 270 shown in FIGS. 9 and 10 employs a somewhat different connector 200 on the trunk cable 220. The connector 200 includes a body 202 that is somewhat shorter than the body 102 of the connector 100, and the stem 204 that extends from the body 102 to support the nut 206 is much shorter. (Such a connector is available from CommScope, Inc. under the trade name EZ FIT). Thus, when the boot 10 is slipped over the connector 200 (FIG. 9), the body 202 does not fill both the main section 12 and the transition section 16 of the boot 10. When the cover 30 is subsequently slipped over the interconnection 270 of the connector 150 of the jumper cable 160 (FIG. 10), the flange 34 abuts the main section 12 of the boot 10, and the nut 206 and connector 150 reside within the trunk 36 and the main section 38 of the cover 30. Thus, the same boot 10 and cover 30 can be used to protect interconnections whether the connector 100 or the connector 200 is employed as the termination of the trunk cable.

Figure 11:
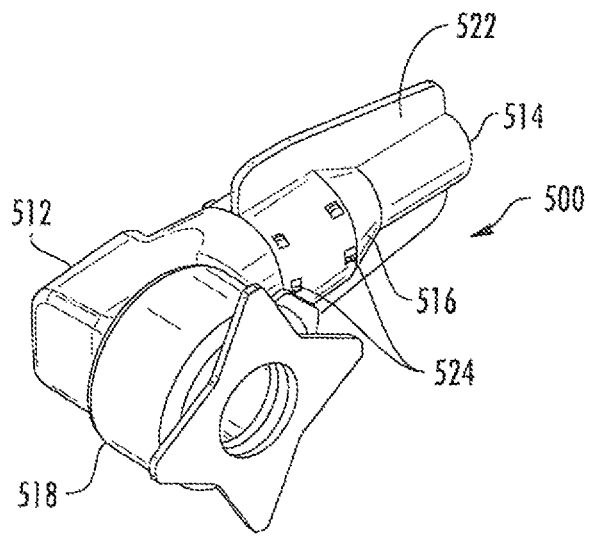
FIG. 11 is a perspective view of a cover boot for an interconnection junction according to alternative embodiments of the invention.
Figure 12:
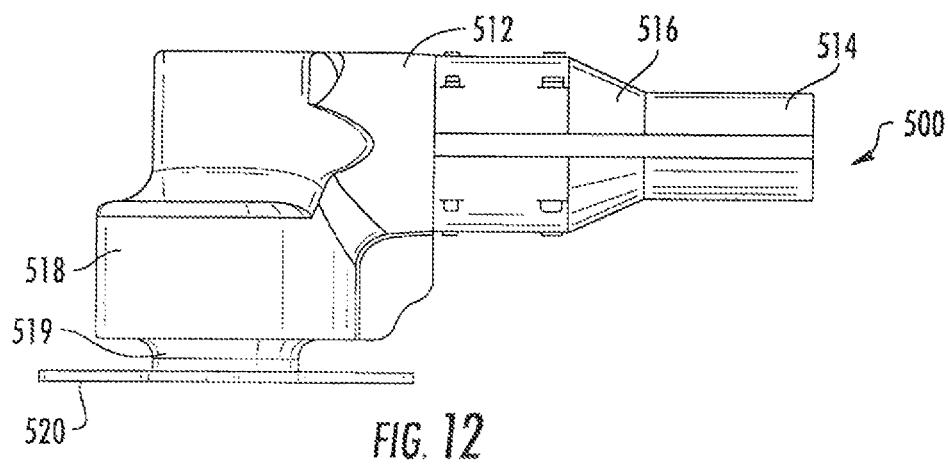
FIG. 12 is a top view of the boot of FIG. 11.
Figure 13:
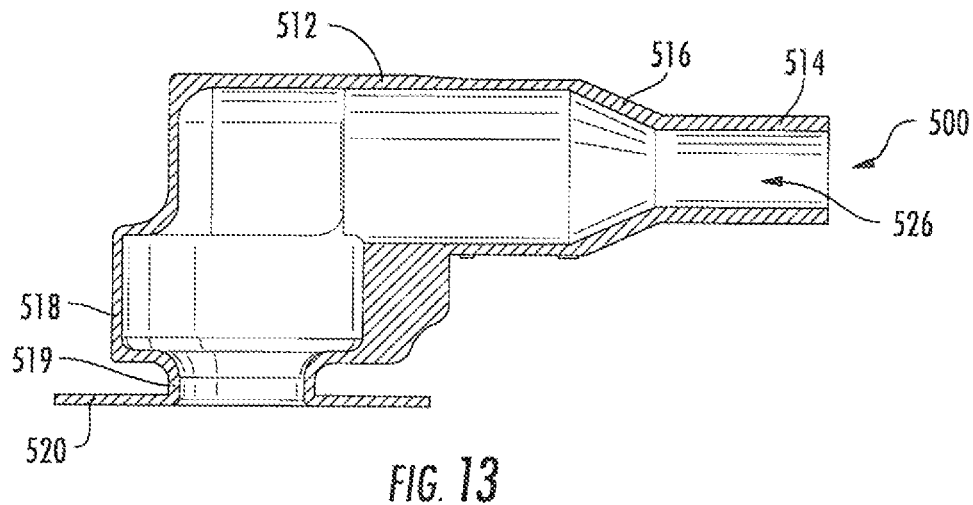
FIG. 13 is a top section view of the boot of FIG. 11.

FIGS. 11-13 illustrate an alternative embodiment of a boot (designated broadly at 500) that can also be employed to protect cable interconnections. The boot 500 is configured to protect interconnections of cables that are oriented perpendicularly to each other (as opposed to being inline or coaxial, as is the case with the cables 120, 160 illustrated herein). The boot 500 includes a main section 512, a generally cylindrical cable collar 514 that is somewhat smaller in diameter than the main section 512, and a tapered transition section 516, which is interposed between the cable collar 514 and the main section 512. However, the interconnection section 518 is larger than the main section 512 and is oriented perpendicularly to the main section 512. A neck 519 extends from the interconnection section 518, and a flange 520 projects radially outwardly from the free end of the neck 519. The result is a continuous bore 526 that veers 90 degrees between the cable collar 514 and the neck 519. Such a boot can provide sealed protection for an interconnection of a jumper cable inserted into the cable collar 514 and a trunk cable inserted into the neck 519.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A hollow cover boot formed of an elastomeric material, the cover boot comprising, in merging succession:
   a cable collar;
   a transition section;
   a main section;
   an interconnection section; and
   a neck;
   wherein the main section has an inner diameter greater than an inner diameter of the cable collar, the neck has an inner diameter less than the inner diameter of the interconnection section; and the cable collar is oriented approximately 90 degrees from the neck; and
   wherein a grip member extends from at least one of the main section and the interconnection section; and
   wherein the transition section tapers between the main section and the cable collar.

2. The cover boot defined in claim 1, wherein the at least two fins project from the cable collar.

3. The cover boot defined in claim 1, wherein the cover boot is formed of rubber.

4. The cover boot defined in claim 1, wherein the interconnection section has an inner diameter greater than the inner diameter of the main section.

5. The cover boot defined in claim 1, further comprising at least two flanges projecting from the neck.

6. The cover boot defined in claim 5, wherein the grip member extends from both the main section and the interconnection section.

7. The cover boot defined in claim 1, wherein the two flanges are positioned on opposite sides of the neck.

* * * * *

UNITED STATES PATENT AND TRADEMARK OFFICE
CERTIFICATE OF CORRECTION

PATENT NO. : 10,505,352 B2
APPLICATION NO. : 16/291536
DATED : December 10, 2019
INVENTOR(S) : Ronald A. Vaccaro It is certified that error appears in the above-identified patent and that said Letters Patent is hereby corrected as shown below:

In the Claims

Column 6, Line 37, Claim 2:
Please correct "wherein the at least" to read -- wherein at least --

Signed and Sealed this
Eighteenth Day of February, 2020

Andrei Iancu
*Director of the United States Patent and Trademark Office*